Oct. 16, 1934.   C. HALL, JR   1,977,554
ATTACHMENT FOR OPERATING GATE VALVES BY MEANS OF
FLUID PRESSURE FROM ANY DESIRED DISTANCE
Filed July 22, 1932   6 Sheets-Sheet 1
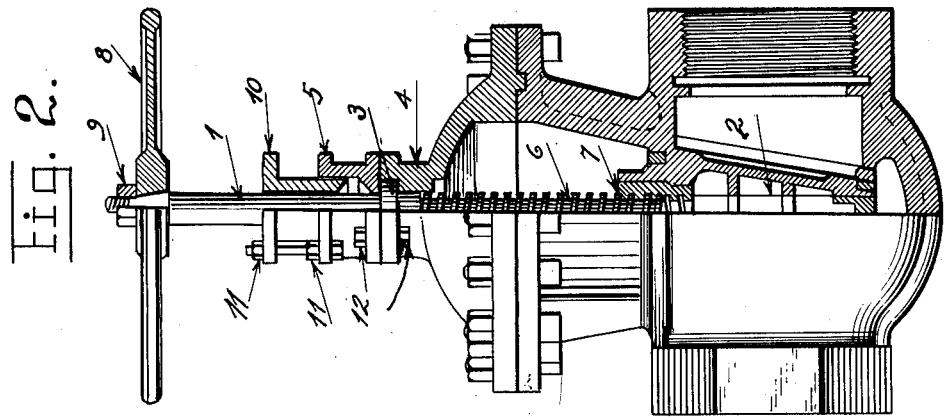
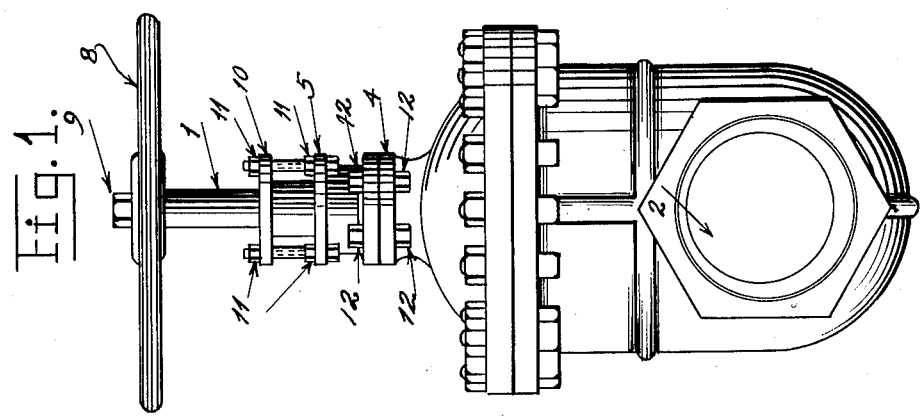
Inventor
C. Hall, Jr.
By
Attorneys

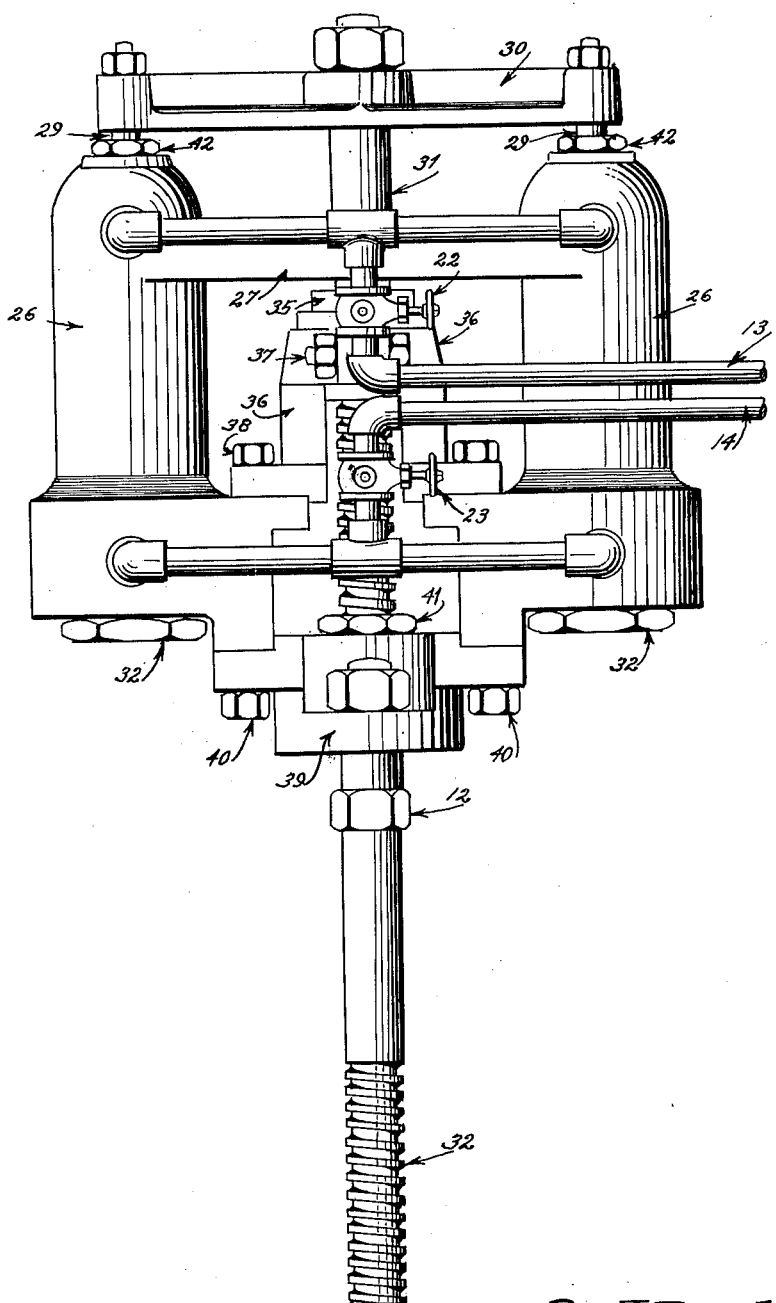

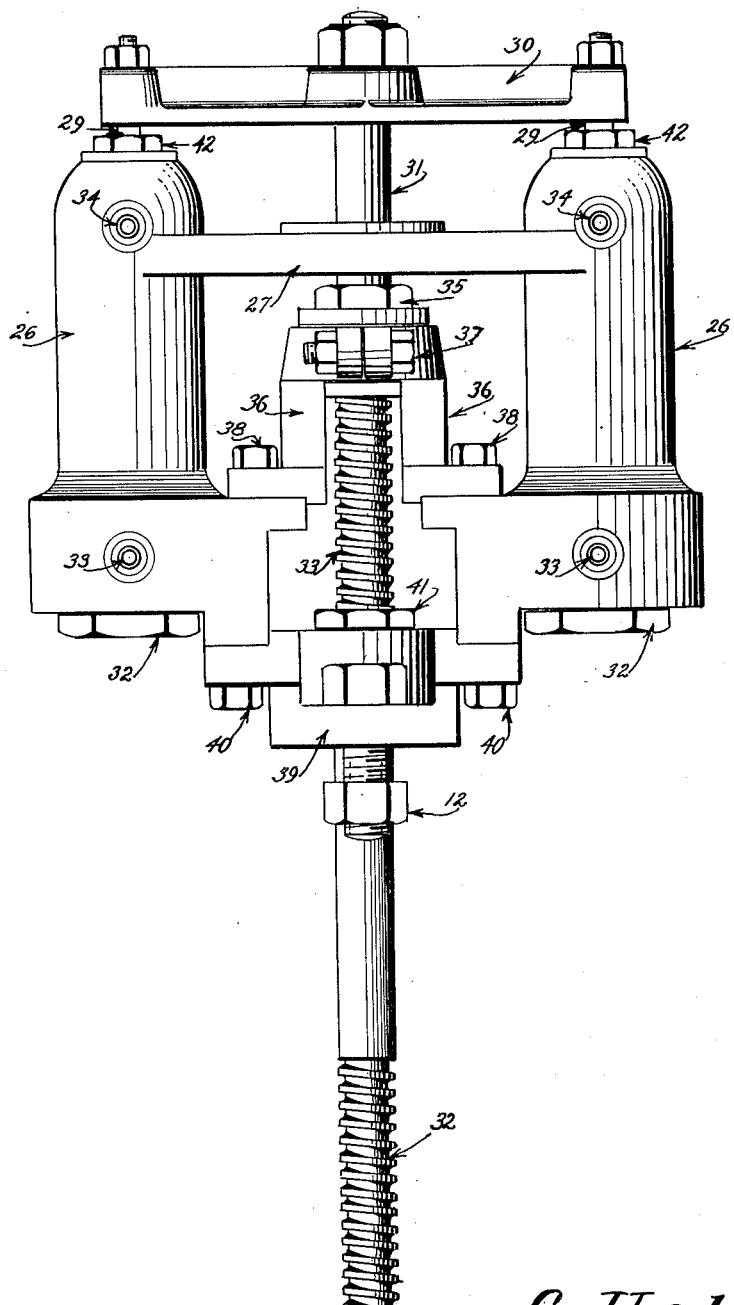

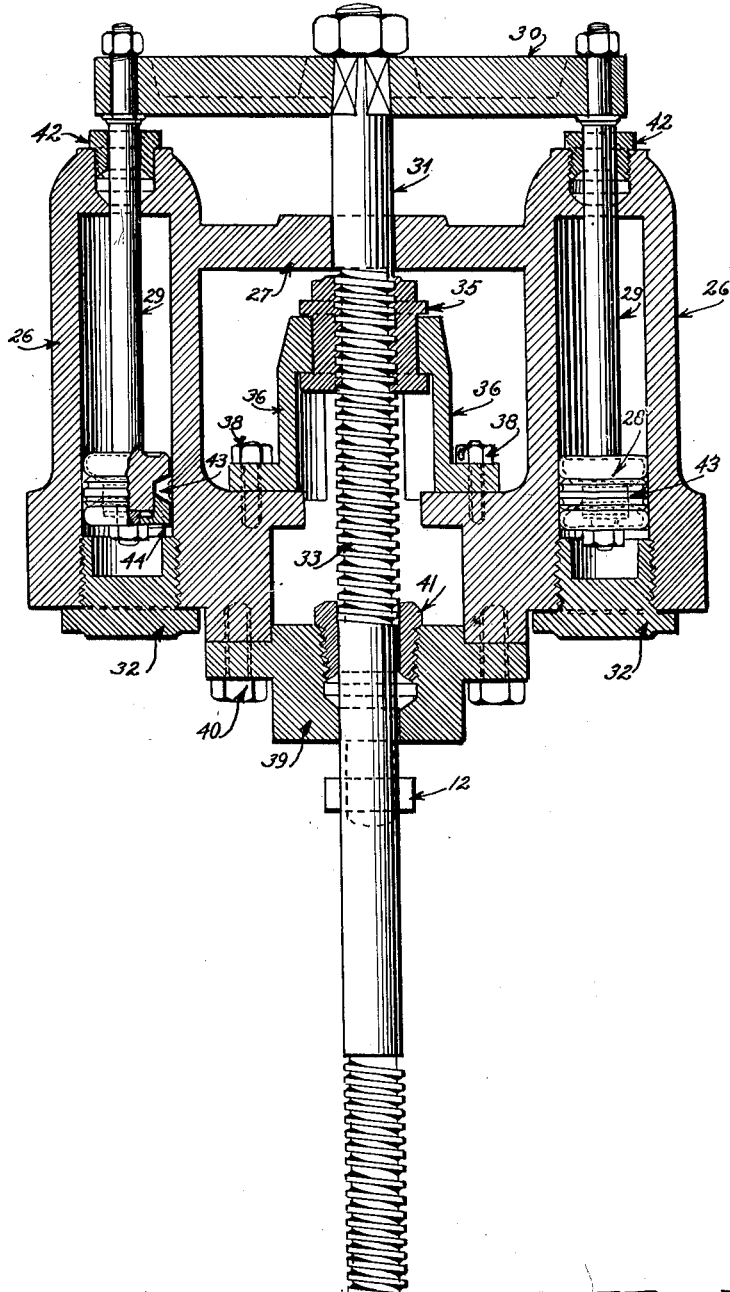

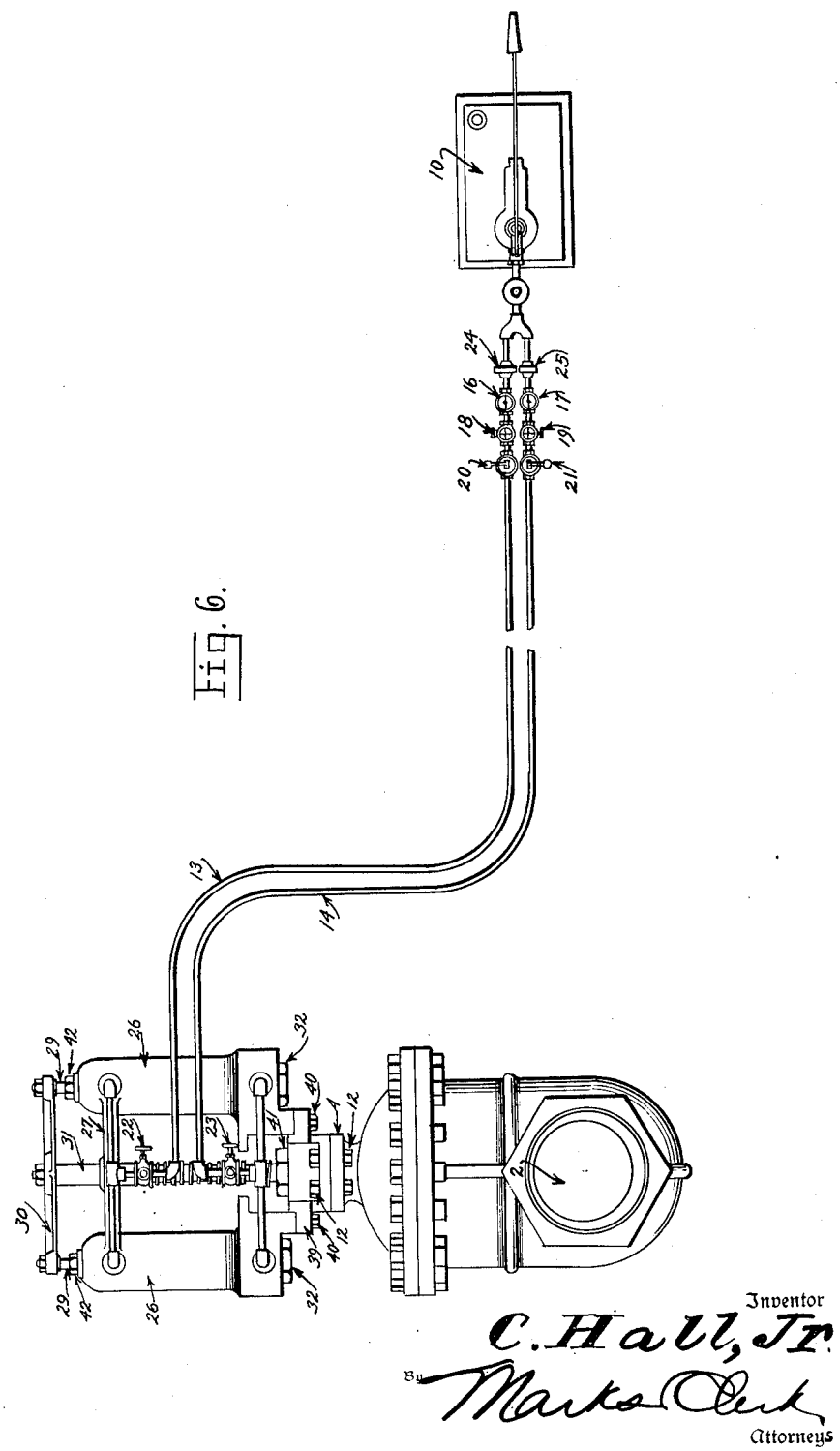

Oct. 16, 1934. C. HALL, JR 1,977,554
ATTACHMENT FOR OPERATING GATE VALVES BY MEANS OF
FLUID PRESSURE FROM ANY DESIRED DISTANCE
Filed July 22, 1932 6 Sheets-Sheet 6

Inventor
C. Hall, Jr.
By Marks Clark
Attorneys

Patented Oct. 16, 1934

1,977,554

UNITED STATES PATENT OFFICE 1,977,554

ATTACHMENT FOR OPERATING GATE VALVES BY MEANS OF FLUID PRESSURE FROM ANY DESIRED DISTANCE

Carlos Hall, Jr., Mexico, Mexico

Application July 22, 1932, Serial No. 624,127
In Mexico June 23, 1932

2 Claims. (Cl. 137—139)

REISSUED
JUN 16, 1936

This invention refers to an attachment for opening and closing gate valves by means of pressure of water, air, steam, gas or any other fluid element from any desired distance or by hand.

The attachment according to the present invention is illustrated in the accompanying drawings, in which the same numbers of reference refer to the same parts in all the figures.

In said drawings:

Fig. 1 is a front view of an ordinary "nonrising stem" valve.

Fig. 2 is a vertical semisectional view of the same valve seen from the side.

Fig. 3 is a view in elevation of an attachment for "nonrising stem" valves.

Fig. 4 is a similar view of the same attachment but without the pipe connections and drain cocks, in order to better show details of the attachment.

Fig. 5 is a vertical cross section of the same attachment.

Fig. 6 shows the same attachment installed on a "nonrising stem" valve, the pipes conducting fluid pressure and a hydraulic pressure pump which will operate the attachment. The form of using hydraulic pressure is only shown as an example, as any other kind of fluid element may be employed.

The following is a description of the mechanism and operation of the different attachments mentioned in the foregoing.

The mechanism and the operation of the attachment will be described in the following order:

1—Attachment with two cylinders for use on "nonrising stem" valves. Figs. 1, 2, 3, 4, 5 and 6.

Figure 9:
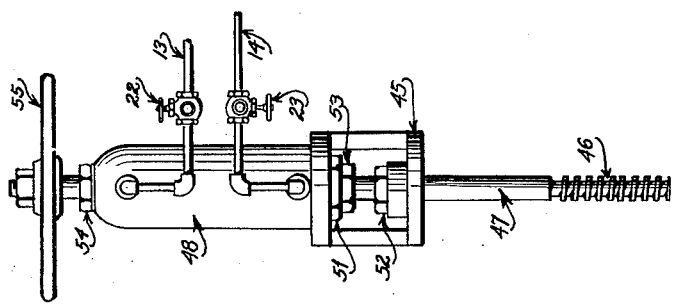
Fig. 9 is a total view of an attachment with only one cylinder for a "nonrising stem" valve.
Figure 8:
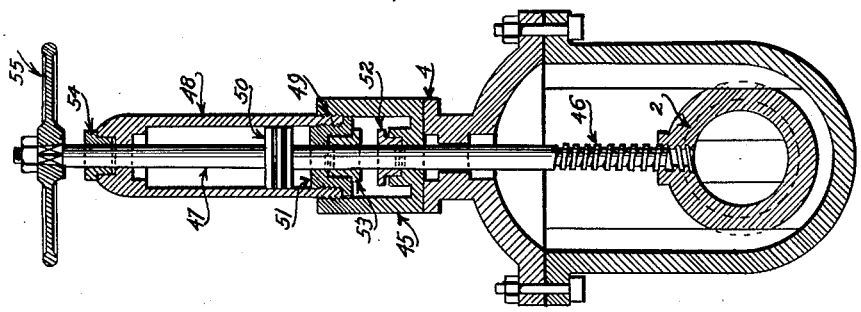
Fig. 8 shows a vertical cross section of the same attachment and valve.
Figure 7:
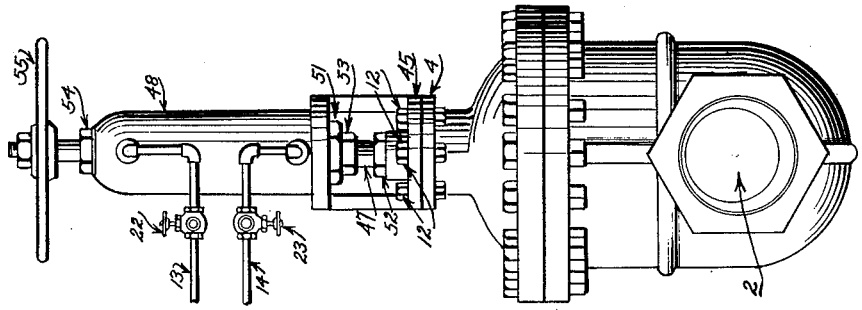
Fig. 7 shows an attachment with only one cylinder, which is connected to a "nonrising stem" valve.

2—Attachment with only one cylinder for use on "nonrising stem" valves. Figs. 7, 8 and 9.

As is well known, a "nonrising stem" valve consists of the stem (1) which opens and closes the gate (2) of the valve. The stem is provided at about its middle portion with a collar (3) which is held in the valve body by the head of the dome (4) and the stuffing box (5) in such a manner that it cannot be raised or lowered but only turned. The opening or closing of the valve by means of the gate (2) is effected by means of the thread (6) on the stem (1) which corresponds to the thread (7) of the gate (2), in such a manner that, for instance, when the hand wheel (8) is turned to the right, the gate (2) will rise on the thread (6) of the stem (1), or it will descend on the same thread when the wheel is turned to the left. In both operations the stem (1) will not partake in the movement of the gate.

The attachment with two cylinders for "nonrising stem" valves is connected to the valve in the following manner:

The nut (9), the hand wheel (8), the stuffing box (10), screws and nuts (11), stuffing box (5), the screws and nuts (12) of the stuffing box and the stem (1), are removed from the valve as shown in Fig. 1 whereafter the attachment shown in Fig. 6 is placed on the upper part of the valve and secured by means of the screws and nuts (12). Then the pipes (13) and (14), which conduct fluid pressure from a distance for operating the valves, as for instance from a pump (15) or from a deposit of air, gas, vapor or any other fluid element in compressed condition, are connected. In order to open the valve from a long distance by means of the attachment, the following has to be done:

The valve (17) is opened and the drain cock (19) is closed, the valve (16) is closed and the drain cock (18) is opened. When this is done, pressure is applied either by means of the pump (15) or by means of the pressure deposit. In this manner there will be an injected fluid pressure through the pipe (14) to the lower part of the cylinders beneath the plungers, and consequently these plungers when rising will open the gate (8) of the valve dislodging the fluid element contained in the upper part of the cylinders through the pipe (13) and drain cock (18).

To close the valve by means of the attachment and by fluid pressure, the following has to be done:

Close the valve (17), open the drain cock (19), open the valve (16) and close the drain cock (18).

When hydraulic pressure is used for operating the attachment then the pipes (13) and (14) will first have to be filled with water, and in order to do this, the valves (22) and (23) must first be opened closing at the same time drain cocks (18) and (19), whereafter the valves (16) and (17) are opened and the pump is started to work until sufficient water comes out through the valves (22) and (23).

Each pipe (13) and (14) is provided near the pump (15) with manometers (24) and (25) and safety valves (20) and (21). The manometers have for their object to avoid that more pressure than that required for opening and closing the valve be injected, and the safety valves will allow the escape of any excess of pressure caused for instance by a fire near the attachment and the consequent production of steam by the water contained within the cylinders of the attachment and in the pipes (13) and (14).

The attachment with two cylinders for "non-rising stem" valves is composed of the following: (Figs. 3, 4, 5 and 6).

The main body of the attachment is formed by two twin cylinders (26) which constitute a single body as they are united by a bridge (27). Inside the said cylinders are found the plungers (28) which move the stems (29) which in turn communicate the movement, by means of the bridge (30), to the stem (31) of the attachment and thereby to the gate of the valve.

As may be seen in Fig. 4, the mouths of the cylinders are hermetically closed by means of the plugs (32) so that when pressure is applied through the apertures (33), the plungers will ascend and thereby open the gate of the valve. If pressure is applied through the apertures (34) then the plungers (28) will descend and thereby close the gate (2) of the valve.

As may be seen in Figs. 3, 4 and 5, the stem (31) is provided with thread on its inferior part in order to connect with the gate of the valve. At about its middle portion the said stem is also provided with thread so that the valve may be opened and closed by hand by means of a sectioned nut (35) and the braces (36). These pieces (35) and (36) should be removed when the attachment is operated by fluid pressure, and this is done by removing the screws (37) and (38).

The attachment according to Figs. 3, 4, 5 and 6 is connected to the base (39) by means of screws (40) and the base (39) is connected directly to the head (4) of the valve by means of screws (12). This base has not been made an integral part of the attachment with the object of being able to use an attachment on several kinds or types of valves of the same size, as in this case only the base would have to be made of different size. Both the stem (31) and the stems (29) are provided with stuffing boxes (41) and (42). The stems (28) are provided with metallic adjusting rings (43) so that in case of fire in a petroleum well during which the leather washers of the plungers are destroyed, the said plungers will still operate the attachment by fluid pressure for closing the valve.

Figs. 7, 8 and 9 show the same attachment but constructed with only one cylinder. Otherwise this attachment is constructed with the same characteristics as the one just described, and can be applied to any kind of "nonrising stem" valve for the same purpose described.

The form shown in Figs. 7, 8 and 9 is very simple, as it can be connected directly to the upper part (4) of the valve by means of the screws (12).

In order to provide an ordinary "nonrising stem" valve with this attachment it will be necessary to remove the hand wheel (8), the stuffing box (10), the screws and nuts (11), the stuffing box (5), the screws and nuts (12) of the stuffing box and the stem (1) whereafter the attachment is mounted on the part (4) of the valve (Fig. 7). The base (45) is thereafter secured to the part (4) by means of screws (12) connecting previously the thread (46) of the stem (47) of the attachment to the gate (2) of the valve.

The attachment consists of a cylinder (48) which is united with the base (45) by means of thread (49). The cylinder has a stem (47) with a plunger (50) which operates the stem (47) of the attachment by fluid pressure. When pressure is applied through pipe (13) the plunger will descend with the stem (47) which will close the gate (2) of the valve. If pressure is applied through pipe (14) then the plunger (50) will ascend together with the stem (47) and open the gate of the valve.

The cylinder (48) is hermetically closed in its lower extreme by the plug (51) and the stem (47) is properly packed in the base (45) by means of the stuffing box (52) and in the plug (51) of the cylinder by means of the stuffing box (53). The stem also has packing in the upper part of the cylinder (48) by means of the stuffing box (54) and has attached in its upper part the hand wheel (55) which serves for opening and closing the valve by hand. This hand wheel will be the same as that found on the original valve.

In order to open or close the valve by hand with the wheel (55) fluid pressure is first applied through pipe (13) until the gate (2) of the valve remains in closed position, and thereafter the drain cocks (22) and (23) are closed. This done, the hand wheel (55), by turning in one direction or the other, will raise or lower the gate (2) on the thread (46) of the stem (47) of the attachment in order to respectively open or close the valve.

The operation of the attachment by fluid pressure is the same as that of the previously described attachment with two cylinders.

Having thus described the invention, what I claim is:

1. A distant operating unitary attachment for standard gate valves of the type including a body, a gate and a bonnet, comprising a single cylinder having the outer end closed with the exception of an opening and the opposite end open and internally and externally threaded, a stem arranged through and projecting beyond both ends of the cylinder, a piston on the stem inside of the cylinder, an externally threaded and centrally apertured closure member removably engaged with the internal threaded part of the cylinder and positioned about the stem, an attaching and supporting member threaded to removably receive the externally threaded inner end of the cylinder, and detachably connected to the bonnet of the valve, packing means in the cylinder, closure member and supporting member, the inner end of the stem being threaded for detachable and adjustable engagement with the gate, means for admitting fluid pressure to the upper and lower parts of the said cylinder, and a hand wheel on the outer end of the stem for independent hand operation of the valve.

2. An attachment for operating from a distance by fluid pressure stemmed gate valves of the type having a body, a gate and a bonnet and comprising a base detachably connected to the bonnet of the valve, a single cylinder detachably connected to the upper part of the base, a stem arranged through the cylinder and base and extending into the body and having a screw thread on its lower end for adjustably connecting the stem to the gate of the valve, a handle member secured to the upper extremity of the stem, a piston on said stem within said cylinder, and means for admitting fluid under pressure to the upper and lower parts of said cylinder from a distant point for operating the gate from a fully closed to a fully opened position or from a fully closed to an intermediate position depending on the adjustable relation between the stem and gate.

CARLOS HALL, Jr.